Jan. 13, 1942.  W. J. MILLER  2,270,076
APPARATUS FOR MANUFACTURING POTTERY
Filed Oct. 4, 1939
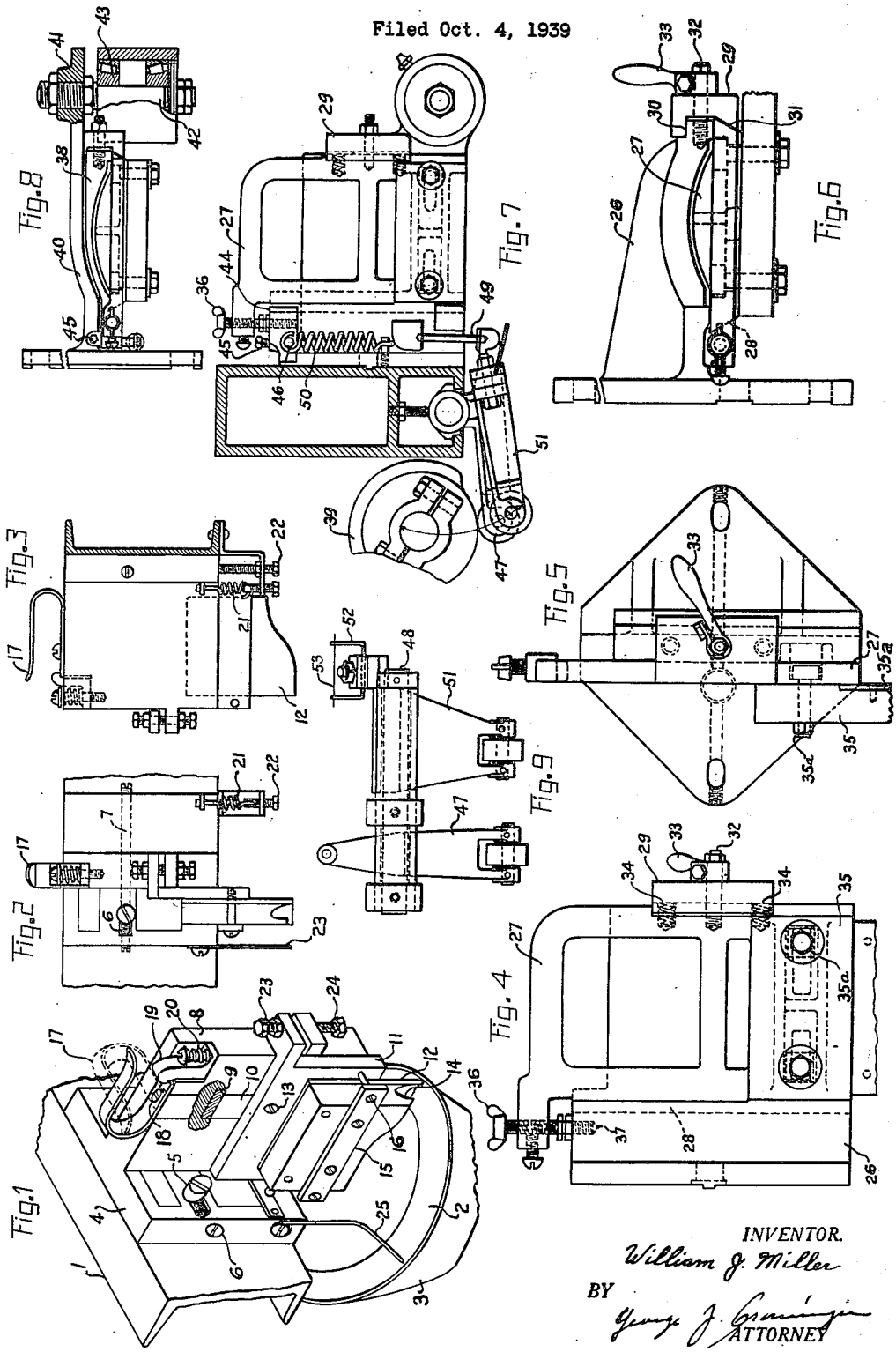
INVENTOR.
William J. Miller
BY
George J. Graninger
ATTORNEY Patented Jan. 13, 1942

2,270,076

UNITED STATES PATENT OFFICE 2,270,076

APPARATUS FOR MANUFACTURING POTTERY

William J. Miller, Swissvale, Pa.

Application October 4, 1939, Serial No. 297,900

29 Claims. (Cl. 25—24)

This invention relates to apparatus for manufacturing pottery, particularly jiggered ware. It has to do with apparatus for supporting and manipulating profile tools adapted primarily for use in connection with automatic fabricating machinery and capable of use in connection with semi-automatic or manual jiggers.

The present practice of manufacturing pottery by automatic machine provides for mechanically conveying charged molds to a fabricating position and there elevating and rotating the said molds relative to a profile tool to shape and smooth the ware. It has been customary heretofore to bolt the profile tool securely to the machine frame. Should the molds become cocked on the conveyor or in the chucks and strike the rigidly held tool, the mold chuck and tool may be broken and the tool dulled therefor necessitating the immediate shutting down of the machine whilst repairs are made with consequent loss of production time. Even for routine tool substitution changes, considerable production time is wasted unbolting the worn tool and properly adjusting the new tool.

One object of this invention is to protect such parts of the machine as the molds, tools and operating parts from damage in case of mold derangement or mal-adjustment of tools; another object is to facilitate tool substitution and proper setting thereof without loss of production time; still another object is to provide the aforesaid improvements in movable or tilting tool assemblies for making constricted brim portion ware, as well as in connection with tools which normally remain stationary during profiling operations.

Among the novel characteristics of my invention may be mentioned the following: the provision of a releasable tool arranged to be knocked out of position when struck by a mold or subjected to excessive pressures; the provision of means enabling displacement of the tool relative to the vertical axis of the mold if struck on the broad side and automatic return to proper operating position without need for tedious manual resetting; the provision of means enabling vertical displacement of the tool if excess pressures are exerted upwardly on the edged profiling surface, and the resetting of the tool in locked position by an easy motion of the hand; the provision of means enabling presetting and adjustment of the tool relative to the work whilst the machine is in operation and the provision of a novel tool support made up of separable parts having means for quickly clamping the same in associated relation, one of said parts mounting the profile tool and being quickly and easily separable from the other for exchange purposes.

The provision of a tilting tool and oscillatable trimmer and means for synchronously operating the same; the provision in a tiltable tool assembly of overload release means enabling the tool to be displaced vertically if subjected to excessive pressure and also means enabling adjustment in the angle of approach of the tool to the work and the speed of application and withdrawal; the provision of means enabling adjustment relative to the work so as to locate the profile in radial position and the provision of a trimmer which may be set automatically quickly at the proper working level by manually pressing it down into engagement with the mold.

In the drawing,

Fig. 1 is a perspective view of a tool holder and mounting therefor incorporating certain of the improvements mentioned herein, said assembly being disclosed in my co-pending application for United States Letters Patent, Serial No. 5,795; this application being a continuation as to all divisible subject matter.

Fig. 2 is a side elevation of the assembly shown in Fig. 1.

Fig. 3 is a front elevation of the assembly shown in Fig. 1.

Fig. 4 is a front elevation of another form of tool assembly including a slidable tool support and tightening clamp.

Fig. 5 is a side elevation of the assembly of Fig. 4 and Fig. 6 is a top plan view of the assembly shown in Figs. 4 and 5.

Fig. 7 is a side elevation of a tilting tool assembly incorporating certain of the improvements and including an oscillatable trimmer and operating mechanism therefor.

Fig. 8 is a top plan view of the assembly of Fig. 7 with certain of the parts shown in section.

Fig. 9 is a top plan view of the operating levers for actuating the trimmer and tilting profile of Fig. 7.

The numeral 1, Fig. 1, represents the lintel of an automatic jiggering machine or that part of a manual jigger or semi-automatic machine on which the profile assembly is mounted. The mold 2 is positioned and elevated into adjacency to a forming tool on a chuck 3 and conveyed thereto either by an automatic transfer in the manner disclosed in my co-pending application Serial No. 5,795 or on the mold seats of a chain conveyor such as that disclosed in my Patent #2,046,525 or placed thereon by hand.

In providing a support for the profile or fabricating device which could be a die or other instrumentality, a T shaped bracket 4 is pivotally mounted on the lintel 1 by a screw 5 located in a slot off-center relative to the head of the bracket, there being headless set screws 6 and 7 bearing thereagainst for lateral adjustment purposes, thereby providing means for moving the tool 12 to proper radial position relative to the mold. The leg 8 of the bracket has a vertical dovetail slot 9 in one side surface thereof in which a slide 10 is secured and positioned. A tool or profile holder 11 is secured to the slide by screws 13 and a profile tool 12 and backing member 14 is clamped against the face thereof by a cross bar 15 held on by screws 16. To remove the profile and slide from the bracket, a rotatable hand grip 17 attached to the top end of the slide by a screw 18 may be swung to the dotted line position to release it from a dog 19 which is held in position by an adjustable compression spring 20.

In case the mold 2 strikes the backing member 14 on the broad side face, the bracket 4 is knocked to the right, thus saving the tool and the mold from damage. The bracket 4 pivots on screw 5 against the tension of an adjustable spring 21, Fig. 3, which returns the tool to its previous position relative to the molding surface against an adjustable stop 22.

Should the mold 2 strike the lower edge of the tool, or should the jiggering pressure become excessive thereagainst, the tool holder 11 will be raised or knocked out of position vertically, the overload pressure causing the dog 19 to unlatch. The restore the tool to its working position, the workman need only press down on the handle 17 to again latch the slide 10, the adjusting screws 23 and 24, one on the holder 11, the other on the bracket 4, accurately locating the tool vertically without need for readjustment.

In making a routine exchange of tools, the same technique as just described is employed. It is preferred, to avoid production interruption, that the tool be clamped to the holder before insertion in the bracket and the stop screw 23 set in properly adjusted position. This may be done by having a duplicate frame including a bracket, mold chuck and mold set up beside the machine in which said adjustment can be made or in place of the chuck and mold, a template scribed from a previous setting may be employed. Exchange can then be made instantaneously in the interval between successive jiggerings and without production interruption.

Fastened to the side of the bracket 4 is a stationary trimmer 25 which may be of any suitable design but shown as a length of flexible wire secured at one end and turned outwardly at the other end and downwardly at an angle corresponding to the angle of inclination of the brim of the mold to remove excess clay from the brim of the mold.

The tool holder assemblies shown in Figs. 4, 5 and 6 consists of a bracket 26 adapted to be bolted to the machine lintel 1 and a separable tool holder 27 on which the tool 12 is mounted. The vertical edges of the holder 27 are beveled and one side fits into a beveled groove 28 in the bracket 26 and is held in position by a clamp 29 ledged at 30 to prevent angular displacement and having a beveled surface 31 forming the other half of the dovetail slot. The clamp is tightened by a screw 32 and handle 33 against the tension of springs 34 thereby frictionally holding the holder 27 against displacement unless the edgewise pressure on the tool becomes excessive.

The tool 35a is fastened by screws to a backing piece 35 which is bolted at 35a to the front face of the holder 27. The holder may be preset by means of adjusting screws 36 and 37 as in Fig. 1. If a mold strikes the profiling edge of the tool with sufficient force, or pressure exceeding that required to jigger is imposed on the tool, the slide 27 is raised or knocked upwardly. It may be repositioned by loosening the handle 33, thus allowing the slide to drop back into place. The slide may be changed very quickly by a quick pull up or down, the slide being of open construction to provide a grip bar at the top. It may be adjusted in a dummy setup as explained in connection with the assembly of Fig. 1.

In Figs. 7, 8 and 9, I have shown the aforesaid improvements incorporated in a tilting profiling assembly for use primarily in the manufacture of undercut wire. The holder 27 in this instance is mounted in a swinging frame 38 oscillated by a cam 39. The lintel bracket 40 has a boss 41 at the outer end of the projecting flange for the reception of a laterally adjustable bearing shaft 42 having a bearing 43 on which the swinging frame 38 is sleeved. A lug 44 at the opposite end of the frame 38 has an adjusting screw 45 providing a stop against the top surface of bracket 40, thereby providing means for predetermining the extent of the arc of oscillation and the approach of the tool to the work. The tool in this case would have an undercutting edge and would be moved into position for jiggering after the mold had come up to position so as to avoid interference with the mold.

The cam 39 for oscillating the frame 38 is adjustable and the drive connection is through lever 47, shaft 48 and push rod 49, the frame being returned by means of a spring 50.

Mounted on shaft 48 is a lever 51 also cam operated having a clamp for frictionally securing the U frame 52 of a trimmer, the wire 53 being tensioned between the legs of the U. The trimmer is positioned by manually depressing leg ends of the U until the wire contacts the mold surface adjacent the ware brim.

In operation, the mold is elevated to the profiling position before or coincident with the downward movement of the tool to meet the work and in sequence the trimmer is moved into operating position to cut away the excess material. The tool and trimmer are raised previous to or coincident with withdrawal of the mold.

It will be seen with the foregoing improvements it is possible to quickly exchange tools without need for tedious adjustment albeit means are provided for adjusting the tool relative to the mold surface without removal from the machine and while the operation thereof ensues. Furthermore, the tool may be removed and replaced in one simple easy operation not requiring the removal of screws or tedious adjustments peculiar to present day practice. Moreover, the present improvements are adaptable to both stationary and removable tool mounting arrangements.

Having thus described my invention, what I claim is:

1. In apparatus for manufacturing jiggered pottery ware, a lintel, a profile tool and a holder for said tool clamped to slide relative to said lintel.

2. In apparatus for manufacturing jiggered pottery ware, a lintel, a profile tool and a holder for said tool clamped to slide relative to said lintel, said holder being rotatably mounted with respect to said lintel.

3. In apparatus for manufacturing jiggered pottery ware, a lintel, a profile tool, a holder for said tool clamped to slide relative to the lintel in response to overload pressure on the working edge of said profile tool exceeding that normally required to jigger.

4. In apparatus for manufacturing jiggered pottery ware, a lintel, a profile tool, a holder for said tool, a grooved slide rest supported by said lintel, said holder being mounted in said groove and slidable therein in response to pressure on the working edge said profile tool exceeding that normally required to jigger, and releasable means for clamping the holder and slide rest together.

5. In apparatus for manufacturing jiggered pottery ware, a profile tool and a support therefor, comprising relatively movable members having a tongue and groove sliding association, together with means for clamping the relatively movable members in associated relation, said last named means permitting relative sliding movement therebetween in response to pressure on the working edge of the profile tool exceeding that normally required for jiggering.

6. In apparatus for manufacturing jiggered pottery ware, a profile tool, a lintel, a support attached to said lintel, a profile holder slidably mounted on said support, said profile being fastened to said holder, means associated with said profile holder and said support for regulating the position of the profile tool relative to the work, and means for securing said holder and said support in associated relation.

7. In apparatus for manufacturing jiggered pottery ware, a profiling device including a holder provided with a slide and an edged profile, a support therefor, said slide and said support being relatively movable in response to pressure on the working edge of said profile tool exceeding the normal jiggering pressure, and means for fastening said slide and said support together.

8. In apparatus for manufacturing pottery ware, a fabricating tool and a holder therefor, a support for said holder, said holder and said support being relatively slidable in response to pressure on the fabricating tool exceeding the normal pressure required to fabricate, and means for fastening said holder and said support together.

9. In apparatus for manufacturing pottery ware, a profile tool and a support therefor, said support having slidable and pivotal movement relative to the work to enable the tool to be knocked out of position in response to an increase in normal working pressure, there being means for automatically returning the support to normal working position, if dislodged therefrom.

10. Apparatus according to claim 9, wherein the last named means includes a spring, and an adjustable stop member.

11. In apparatus for manufacturing pottery ware, a profile tool, a holder therefor and a bracket for supporting said holder, said holder and said bracket being relatively slidable, a latch associated with said bracket and adapted to hold said holder in working position, said latch being releasable in response to pressure on the working edge of said profile tool exceeding the normal jiggering pressure, and means for predetermining the relative position of the holder and bracket when in associated relation, to thereby locate the profile tool at the working position.

12. In apparatus for manufacturing jiggered pottery ware, a profile tool, a holder therefor and a bracket for said holder having relative sliding association therewith, there being means for exerting pressure on said holder, to frictionally support the same in position relative to said support.

13. In apparatus for manufacturing jiggered pottery ware, a profile tool, a holder therefor and a bracket for supporting said holder having relative tongue and groove sliding association, there being means for clamping the said holder and bracket in associated relation, comprising a grooved member engageable with a side surface of the holder, and means for tightening said member thereagainst.

14. In apparatus for manufacturing pottery ware, a profile tool and means for supporting the same having two relatively slidable members, said profile being attached to one of said members, means for predetermining the position of the profile tool relative to the work and a releasable clamp for securing the members together in adjusted position, said members being entirely separable, so that the one carrying the profile tool, may be removed and replaced by another having similar position predetermining means which may be preset.

15. In combination with apparatus for manufacturing pottery ware, a profile tool, a slidable member to which the tool is fastened and a support member therefor, there being means for adjusting the working position of the tool associated with at least one of said members, a clamp for securing said members together in adjusted position, said slidable member being entirely separable from said support member, so that the profile tool may be removed and another slidable member inserted in predetermined position whilst the apparatus is in operation.

16. In apparatus for manufacturing pottery ware, a profile tool and a holder therefor comprising a slide, a pivoted frame with means for mounting said holder, means for oscillating said frame, there being means for predetermining the arc of oscillation of the frame, to thereby regulate the extent of approach and withdrawal of the profile tool, relative to the work.

17. In apparatus for manufacturing pottery ware, a profile holder, a profile attached thereto, a supporting means therefor having a sliding association with said holder, said support including an oscillatable frame in which said holder is removably mounted, a mold adapted to be moved into and out of working position, and means for oscillating said frame in timed relation with the movement of said mold.

18. In apparatus for manufacturing pottery ware, an oscillatable profiling device having means for holding a profile therein comprising a holder to which the profile is attached, means for clamping said holder in said device, said holder being entirely removable from said device for interchange purposes, and provided with means which may be preset before insertion, to thereby locate the tool in proper position relative to the work.

19. In apparatus for manufacturing jiggered pottery ware, a profile tool and a holder for said tool, and a grooved slide rest for said holder, said holder being slidably mounted therein and releasably clamped thereto.

20. Pottery profiling apparatus comprising, in combination, a holder, a pottery profile tool attached to one side surface thereof, a support for said holder to which said holder is slidably clamped, and adjustable means for predetermining or adjusting the position of the holder relative to the support, when in associated relation.

21. Pottery profiling apparatus comprising, in combination, a holder, a pottery profile tool attached to one side surface of said holder, a slide rest for the reception of the holder, adapted to support the same and a clamp forming a portion of the slide rest, for releasably securing the holder and slide rest in associated relation.

22. Pottery profiling apparatus including a profile and a holder therefor, a slide rest, said slide rest and holder being clamped together for relative movement, and adjustable means for moving or positioning the holder relative to the slide rest when in associated relation.

23. Pottery profiling apparatus comprising, in combination, a support, a profile tool and a holder clamped to slide relative to said support, and means for securing said holder and support in associated relation including a hand grip attached to said holder.

24. A tool holder for a pottery profile tool comprising, a slide having bevelled marginal edges by means of which the holder is adapted to be clamped to slide in a predetermined path, and means for fastening a profile tool to said holder.

25. A tool holder for a pottery profile tool comprising, a slide having bevelled marginal edges by means of which said tool holder may be clamped to slide in a preletermined path, a hand grip portion, and means for demountably attaching a profile tool to said tool holder.

26. A tool holder for a profile tool comprising, a slide with bevelled marginal edges by means of which said tool holder may be slidably clamped for movement in a predetermined path, means for fastening a profile tool to one side surface of the holder, and adjustable means for locating the tool holder relative to the work.

27. In apparatus for manufacturing jiggered pottery ware, a support, a profile tool and a holder for said tool slidably clamped to said support, said support being mounted for oscillatable movement and means for oscillating said support.

28. In combination, a pottery profile tool mounted for vertical oscillatory movement and a trimmer also mounted for vertical oscillatory movement and means for independently oscillating said tool and said trimmer comprising a rotatable shaft having cams adjustably secured thereto capable of varying the phase of motion of the tool relative to the trimmer or vice versa.

29. In apparatus for jiggering and trimming pottery ware, an oscillatable profile, an oscillatable trimmer, a shaft, oscillatable levers mounted on said shaft for oscillating said profile and said trimmer, a rotatable shaft and cams mounted on said rotatable shaft for oscillating said levers.

WILLIAM J. MILLER.